US012634526B1

(12) United States Patent
Tian

(10) Patent No.: US 12,634,526 B1
(45) Date of Patent: May 19, 2026

(54) HIGH EFFICIENCY ENCODER AND ASSOCIATED CONTROL METHOD OF IN-LOOP FILTER

(71) Applicant: Realtek Semiconductor Corp., HsinChu (TW)

(72) Inventor: Jing-Hua Tian, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 19/177,629

(22) Filed: Apr. 13, 2025

(51) Int. Cl.
| | |
|---|---|
| *H04N 19/86* | (2014.01) |
| *H04N 19/117* | (2014.01) |
| *H04N 19/167* | (2014.01) |
| *H04N 19/176* | (2014.01) |
| *H04N 19/61* | (2014.01) |

(52) U.S. Cl.
CPC ........... *H04N 19/86* (2014.11); *H04N 19/117* (2014.11); *H04N 19/167* (2014.11); *H04N 19/176* (2014.11); *H04N 19/61* (2014.11)

(58) Field of Classification Search
CPC .. H04N 19/117; H04N 19/176; H04N 19/105; H04N 19/159; H04N 19/82; H04N 19/11; H04N 19/119; H04N 19/70; H04N 19/132; H04N 19/46; G06T 5/70
See application file for complete search history.

(56) References Cited

U.S. PATENT DOCUMENTS

2015/0215617 A1 * 7/2015 Leontaris ............. H04N 19/147
375/240.03

* cited by examiner

*Primary Examiner* — Farhan Mahmud
(74) *Attorney, Agent, or Firm* — Winston Hsu

(57) ABSTRACT

The present invention provides a control method of an in-loop filter, which includes steps of: sequentially receiving multiple CTUs of image data; for a specific CTU of the multiple CTUs, dividing the specific CTU into multiple blocks; performing a deblocking-filtering operation on a first portion of vertical boundaries and horizontal boundaries of the multiple blocks to generate filtered pixel values; not performing the deblocking-filtering operation on a second portion of the vertical boundaries and the horizontal boundaries of the multiple blocks to generate non-filtered pixel values; performing the deblocking-filtering operation on a third portion of the vertical boundaries and the horizontal boundaries of the multiple blocks to generate partially filtered pixel values; and generating parameters according to the filtered pixel values, the non-filtered pixel values and the partially filtered pixel values, for use by a next filter.

13 Claims, 5 Drawing Sheets

CTU5

| B1 | B2 | B3 | B4 |
| B5 | B6 | B7 | B8 |
| B9 | B10 | B11 | B12 |
| B13 | B14 | B15 | B16 |

☐ Complete vertical and horizontal boundaries deblocking filtering

▨ No deblocking filtering

☐ Vertical boundary deblocking filtering only

200

| CTU1 | CTU2 | CTU3 |
| CTU4 | CTU5 | CTU6 |
| CTU7 | CTU8 | CTU9 |

HIGH EFFICIENCY ENCODER AND ASSOCIATED CONTROL METHOD OF IN-LOOP FILTER

BACKGROUND OF THE INVENTION

1. Field of the Invention

The present invention relates to a video encoder.

2. Description of the Prior Art

HEVC (High Efficiency Video Coding) is a video compression standard that inevitably causes image distortion during the compression process, such as blocking artifacts and ringing artifacts. To mitigate these distortions, the HEVC standard specifies an in-loop filter during the encoding and decoding processes. The in-loop filter is used to perform filtering operations on the reconstructed pixel values generated during image processing, to improve image quality. The in-loop filter mainly includes a deblocking filter and a sample adaptive offset (SAO) filter. The deblocking filter is used to process reconstructed pixel values to reduce blocking artifacts (i.e., boundary discontinuities) caused by prediction and transform operations, while the SAO filter is used to process the filtered pixels generated by the deblocking filter to improve ringing artifacts. At the encoding end, the SAO parameters, including types and offset, are appropriately calculated. By performing interactive operations between the reconstructed pixels after deblocking filter and the original pixels, the best Rate Distortion Optimization (RDO) is determined, which then selects the appropriate SAO parameters. These parameters are provided to the SAO filter to process the filtered pixels, and these parameters are transmitted to the decoding end via the bitstream.

In practical operation, HEVC works based on coding tree units (CTUs). For example, an image frame is divided into multiple CTUS for encoding, decoding, and related operations. The operations of the deblocking filter and SAO filter are also based on CTUs. However, since the boundary of each CTU requires the use of reconstructed pixel values from other CTUs during the deblocking filter operation, and these pixel values from other CTUs may not have been generated yet, and since the parameters operation of SAO filter relies on the filtered pixels generated by the deblocking filter, additional memory space is required to store the filtered pixel values of multiple CTUs that have completed the deblocking filter operation for use by other CTUs. This, however, reduces encoding efficiency and leads to wasted storage space.

SUMMARY OF THE INVENTION

Therefore, one of the objectives of the present invention is to propose a control method of the in-loop filter, to solve the problems described in the prior art.

According to one embodiment of the present invention, a control method of an in-loop filter comprises steps of: sequentially receiving multiple CTUs of image data; for a specific CTU of the multiple CTUs, dividing the specific CTU into multiple blocks; performing a deblocking-filtering operation on a first portion of vertical boundaries and horizontal boundaries of the multiple blocks to generate filtered values; pixel not performing the deblocking-filtering operation on a second portion of the vertical boundaries and the horizontal boundaries of the multiple blocks to generate non-filtered pixel values; performing the deblocking-filtering operation on a third portion of the vertical boundaries and the horizontal boundaries of the multiple blocks to generate partially filtered pixel values; and generating parameters according to the filtered pixel values, the non-filtered pixel values and the partially filtered pixel values, for use by a next filter.

According to one embodiment of the present invention, an encoder comprising a first calculation circuit, a transform circuit, a quantization circuit, an encoding circuit, an inverse quantization circuit, an inverse transform circuit, a second calculation circuit and an in-loop filter is disclosed. The first calculation circuit is configured to subtract predicted image data from image data to obtain residual error data. The transform circuit is configured to convert the residual error data into frequency-domain data. The quantization circuit is configured to perform a quantization operation on the frequency-domain data to generate quantized data. The encoding circuit is configured to encode the quantized data to generate encoded data. The inverse quantization circuit is configured to perform an inverse quantization operation on the quantized data. The inverse transform circuit is configured to perform an inverse transform operation on an output of the inverse quantization circuit to generate inverse-transformed residual error data. The second calculation circuit is configured to add the inverse-transformed residual error data to the predicted image data to generate reconstructed image data. The in-loop filter is configured to filter the reconstructed image data to generate processed image data. The in-loop filter performs steps of: sequentially receiving multiple CTUs of the reconstructed image data; for a specific CTU of the multiple CTUs, dividing the specific CTU into multiple blocks; performing a deblocking-filtering operation on a first portion of vertical boundaries and horizontal boundaries of the multiple blocks to generate filtered pixel values; not performing the deblocking-filtering operation on a second portion of the vertical boundaries and the horizontal boundaries of the multiple blocks to generate non-filtered pixel values; performing the deblocking-filtering operation on a third portion of the vertical boundaries and the horizontal boundaries of the multiple blocks to generate partially filtered pixel values; and generating parameters according to the filtered pixel values, the non-filtered pixel values and the partially filtered pixel values, for use by a next filter.

According to one embodiment of the present invention, an encoding method comprises steps of: receiving image data; subtracting predicted image data from the image data to obtain residual error data; converting the residual error data into frequency-domain data; performing a quantization operation on the frequency-domain data to generate quantized data; encoding the quantized data to generate encoded data; performing an inverse quantization operation and an inverse transform operation on the quantized data to generate inverse-transformed residual error data; adding the inverse-transformed residual error data to the predicted image data to generate reconstructed image data; sequentially receiving multiple CTUs of the reconstructed image data; for a specific CTU of the multiple CTUS, dividing the specific CTU into multiple blocks; performing a deblocking-filtering operation on a first portion of vertical boundaries and horizontal boundaries of the multiple blocks to generate filtered pixel values; not performing the deblocking-filtering operation on a second portion of the vertical boundaries and the horizontal boundaries of the multiple blocks to generate non-filtered pixel values; performing the deblocking-filtering operation on a third portion of the vertical boundaries and the horizontal boundaries of the multiple blocks to generate partially filtered pixel values; and generating parameters according to the filtered pixel values, the non-filtered pixel values and the partially filtered pixel values, for use by a next filter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
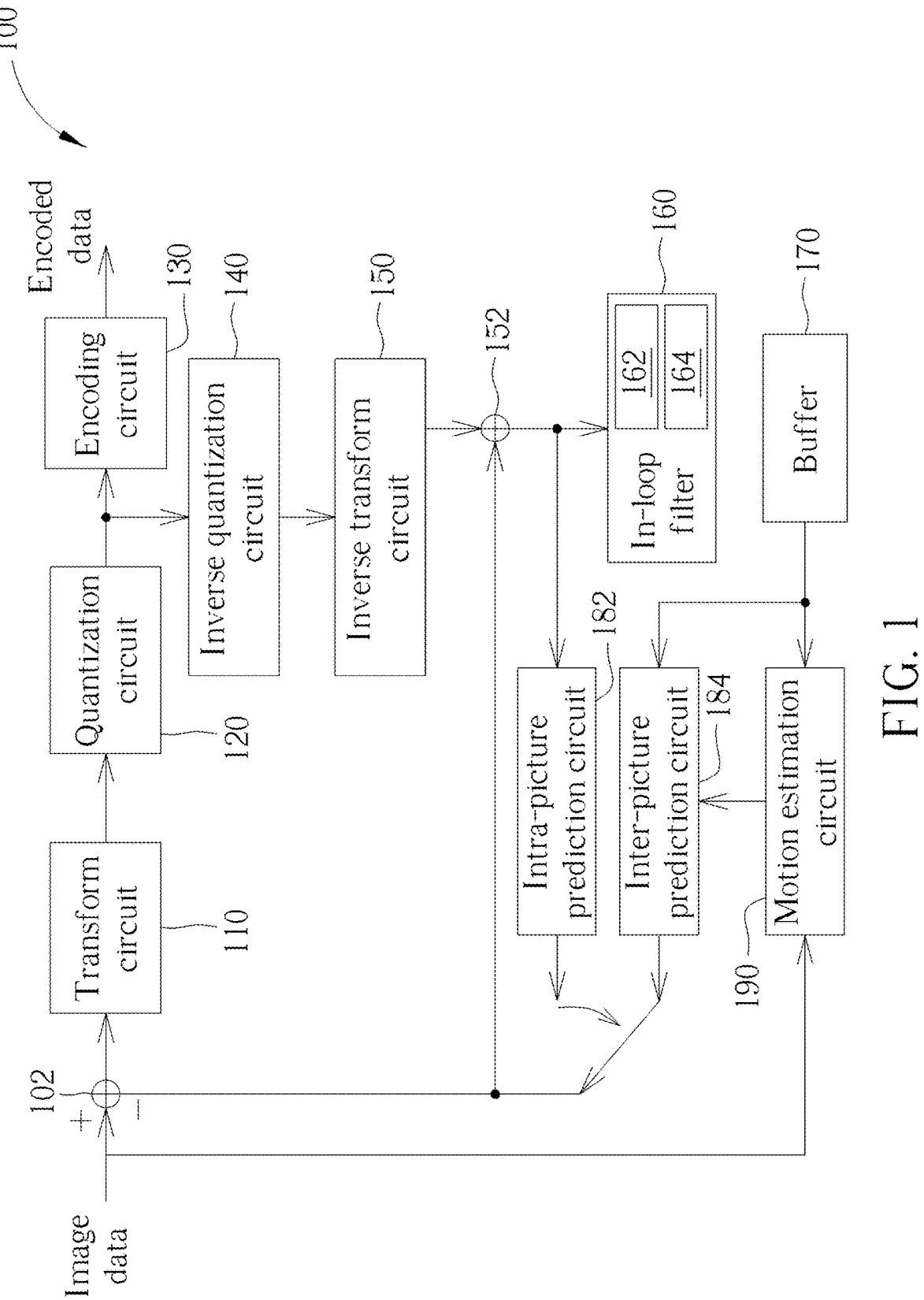
FIG. 1 is a schematic diagram of an encoder according to one embodiment of the present invention.

FIG. 1 is a schematic diagram of an encoder 100 according to one embodiment of the present invention. As shown in FIG. 1, the encoder 100 comprises a calculation circuit 102, a transform circuit 110, a quantization circuit 120, an encoding circuit 130, an inverse quantization circuit 140, an inverse transform circuit 150, a calculation circuit 152, an in-loop filter 160, a buffer 170, an intra-picture prediction circuit 182, an inter-picture prediction circuit 184 and a motion estimation circuit 190. In this embodiment, the encoder 100 supports HEVC specifications, and the encoder 100 is configured to receive and encode image data (image frame data) to generate encoded data.

In the main operations of the encoder 100, the calculation circuit 102 is configured to subtract the predicted image data from the image data to obtain residual error data, wherein the predicted image data is generated by the intra-picture prediction circuit 182 or the inter-picture prediction circuit 184, and the image data can be from an external device. The transform circuit 110 performs Discrete Cosine Transform (DCT) or Discrete Sine Transform (DST) operation on the residual error data to convert the data into frequency-domain data. The quantization circuit 120 performs a quantization operation on the frequency-domain data generated by the transform circuit 110 to generate quantized data, to reduce data size, where the quantization operation for each image frame corresponds to a quantization parameter. The quantized data is subsequently processed by the encoding circuit 130, which can be a Context-based Adaptive Binary Arithmetic Coding (CABAC) entropy encoding circuit, to generate encoded data, which is then transmitted to a following device (not shown). In addition, the inverse quantization circuit 140 performs an inverse quantization operation on the quantized data generated by the quantization circuit 120, and the inverse transform circuit 150 performs an inverse transform operation (e.g., inverse DCT or inverse DST) on the output of the inverse quantization circuit 140 to generate inverse-transformed residual error data. Then, the calculation circuit 152 adds the inverse-transformed residual error data generated by the inverse transform circuit 150 to the predicted image data generated by the intra-picture prediction circuit 182 or inter-picture prediction circuit 184, to generate reconstructed image data, wherein the reconstructed image data includes reconstructed pixel values (e.g., luminance values) of an image frame. The in-loop filter 160 is configured to filter the reconstructed image data to mitigate blocking artifacts and ringing artifacts to generate processed image data (which can also be named as decoded image data), wherein the processed image data is stored in the buffer 170. The intra-picture prediction circuit 182 is configured to generate the predicted image data according to the reconstructed image data. The motion estimation circuit 190 is configured to generate motion information based on the image data and the processed image data, and the inter-picture prediction circuit 184 is configured to generate the predicted image data based on the motion information and the processed image data.

It should be noted that the main operations of the calculation circuit 102, the transform circuit 110, the quantization circuit 120, the encoding circuit 130, the inverse quantization circuit 140, the inverse transform circuit 150, the calculation circuit 152, the buffer 170, the intra-picture prediction circuit 182, the inter-picture prediction circuit 184 and the motion estimation circuit 190 are well known to a person skilled in the art. Since the key technical content of the present invention lies in the operation of the in-loop filter 160, the details of the aforementioned components are omitted here.

Figure 2:
FIG. 2 shows multiple CTUs of image data.

In the HEVC video encoding format, multiple coding tree units (CTUs) of different sizes can be used in the operations of the encoder 100. The CTU typically have 16*16 pixels, 32*32 pixels or 64*64 pixels, and the in-loop filter 160 filters the reconstructed image data in the row of CTUs sequentially. Referring to FIG. 2, the reconstructed image data (image frame data) can be divided into multiple CTUs such as CTU1-CTU9, and the in-loop filter 160 sequentially filters CTU1, CTU2 and CTU3 is a first row, then sequentially filters CTU4, CTU5 and CTU6 is a second row, and then sequentially filters CTU7, CTU8 and CTU9 is a third row, to generate processed image data.

The in-loop filter 160 comprises at least two filters such as a deblocking filter 162 and a SAO filter 164. The deblocking filter 162 is used to reduce blocking artifacts at block edges, and uses adaptive thresholds to smooth discontinuities between adjacent blocks. The SAO filter 164 is configured to use an edge offset mode (directional correction) and/or a band offset mode (intensity-based correction) to correct distortions. Specifically, the deblocking filter 162 sequentially filters CTU1-CTU9 to generate deblocking-filtered CTU1-CTU9, and the SAO filter 164 sequentially filters the deblocking-filtered CTU1-CTU9 to generate the processed CTU1-CTU9.

Regarding the operation of the deblocking filter 162, taking CTU5 as an example, CTU5 is divided into multiple blocks. In this embodiment, not a limitation of the present invention, the CTU5 has the size equal to 32*32 pixels, each block has the size equal to 8*8 pixels, and CTU5 has sixteen blocks B1-B16. The deblocking filter 162 performs deblocking-filtering operation on vertical boundaries and horizontal boundaries of the multiple blocks to generate the deblocking-filtered CTU5 (horizontal boundaries are filtered after filtering the vertical boundaries). Taking the vertical boundary between blocks B5 and B6 as an example, a conventional boundary strength calculation, edge condition check and adaptive filtering operation are performed based on 8*8 pixel values along the boundary, to complete the deblocking-filtering operation on the vertical boundary between blocks B5 and B6. Taking the upper horizontal boundary of the block B2 as an example, the conventional boundary strength calculation, edge condition check and adaptive filtering operation are performed based on 8*8 pixel values along the boundary to complete the deblocking-filtering operation on the upper horizontal boundary of the block B2, wherein half of these 8*8 pixel values are located in block B2, while the other half are located in CTU2 shown in FIG. 2. It is noted that the deblocking-filtering operation on each of the vertical boundaries and horizontal boundaries always need pixel values located on two different blocks, so some of the blocks within CTU5 may not be able to complete the deblocking-filtering operation if the required pixel values in the other block are not received.

Figure 3:
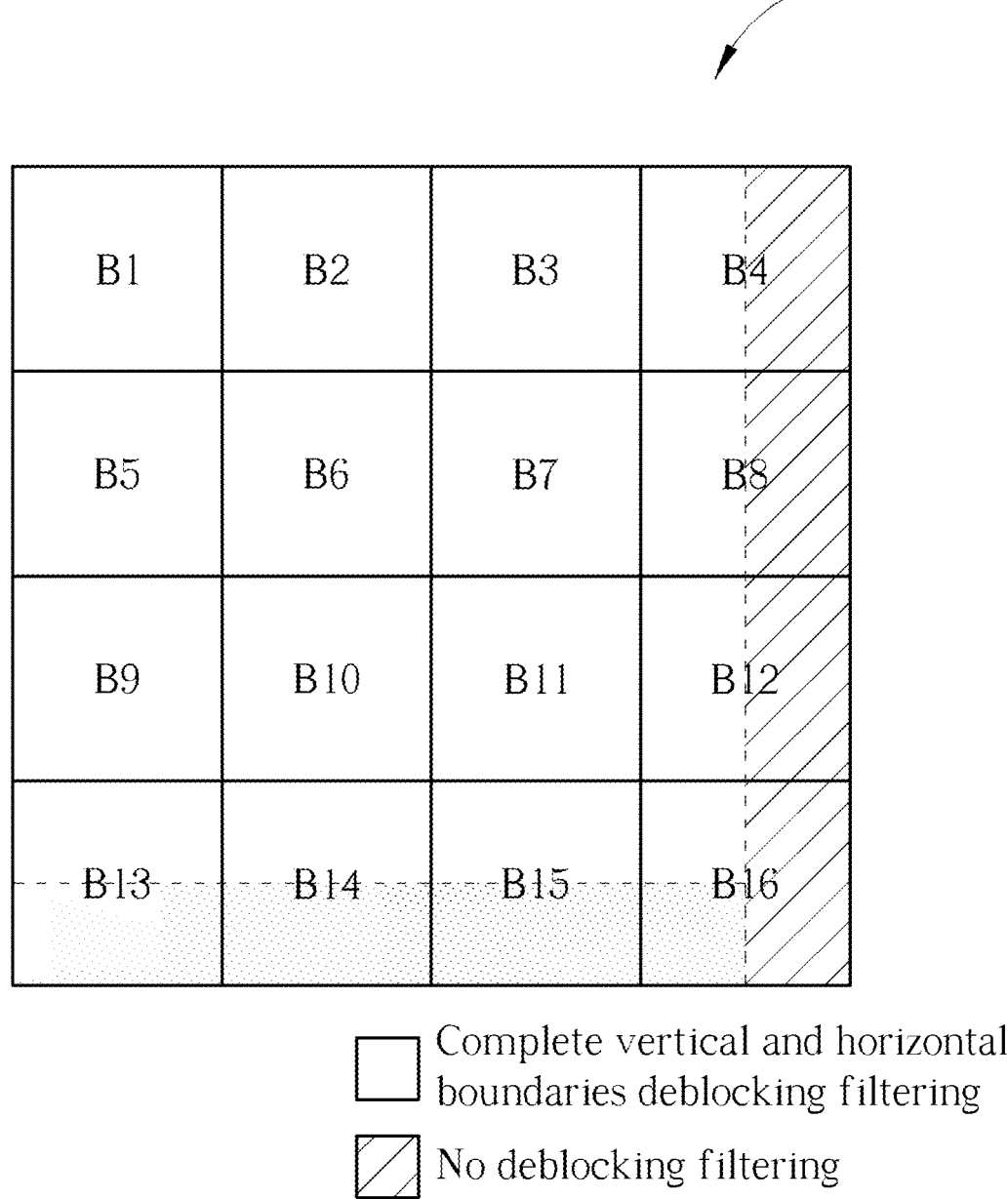
FIG. 3 is a diagram of performing deblocking filtering operation on a CTU according to one embodiment of the present invention.

Specifically, referring to FIG. 3, deblocking-filtering operation is completed on all vertical boundaries and all horizontal boundaries of the block B1-B3, B5-B7 and B9-B11, so that all of the block B1-B3, B5-B7 and B9-B11 comprise filtered pixel values. Regarding pixels located on the left side of each of the blocks B4, B8 and B12, because the deblocking-filtering operation is completed on the left vertical boundaries and the left horizontal boundaries, the left side of blocks B4, B8 and B12 comprise filtered pixel values. Regarding pixels located on the right side of each of the blocks B4, B8, B12 and B16, because reconstructed pixel values of the right-side CUT6 are not obtained, the deblocking filter 162 cannot perform deblocking-filtering operation on the right vertical boundary and right horizontal boundaries of the blocks B4, B8, B12 and B16, so the right side of blocks B4, B8 and B12 comprise non-filtered pixel values (i.e., reconstructed pixel values) instead of the filtered pixel values. Regarding pixels located on the upper side of each of the blocks B13, B14 and B15, because the deblocking-filtering operation is completed on the upper vertical boundaries and the upper horizontal boundaries, the upper side of blocks B13, B14 and B15 comprise filtered pixel values. Regarding pixels located on the lower side of each of the blocks B13, B14 and B15, because reconstructed pixel values of the lower-side CUT8 are not obtained, the deblocking filter 162 only performs deblocking-filtering operation on the vertical boundaries of the blocks B13, B14 and B15, but the deblocking filter 162 cannot perform deblocking-filtering operation on the lower horizontal boundary of the blocks B13, B14 and B15, so the lower side of blocks B13, B14 and B15 comprise partially filtered pixel values. In addition, the lower-left area of the block B16 comprises partially filtered pixel values, while the upper-left area of the block B16 comprises filtered pixel values.

In other words, the deblocking filter 162 performs a deblocking-filtering operation on a first portion of vertical boundaries and horizontal boundaries of the multiple blocks to generate filtered pixel values (blank area shown in FIG. 3), the deblocking filter 162 does not perform the deblocking-filtering operation on a second portion of the vertical boundaries and the horizontal boundaries of the multiple blocks to generate non-filtered pixel values (slash area shown in FIG. 3), and the deblocking filter 162 performs the deblocking-filtering operation on a third portion of the vertical boundaries and the horizontal boundaries of the multiple blocks to generate partially filtered pixel values (i.e., dotted area shown in FIG. 3). In this embodiment, the deblocking filter 162 performs the deblocking-filtering operation only on the vertical boundaries of a portion of the multiple blocks to generate the partially filtered pixel values, wherein the portion of the multiple blocks is in a bottom block row of the specific CTU. In addition, the second portion of the vertical boundaries and the horizontal boundaries of the multiple blocks to generate non-filtered pixel values is in a rightmost block column of the specific CTU.

In this embodiment, in order to improve the encoding efficiency and saving memory space, the SAO filter 164 directly uses the above-mentioned filtered pixel values, partially filtered pixel values and reconstructed pixel values (reconstructed pixel values are pixel values that have not been processed under deblocking-filtering operations) to obtain SAO parameters, for the use in the following SAO filtering operation. In this embodiment, the SAO parameters may include the type of filtering to be applied, i.e., band offset (BO) mode or edge offset (EO) mode or none, the offset values to be used, and any other information needed in order to apply the offset values. After the SAO parameters are obtained, the SAO filter 164 adds specific offsets to the pixel values of CTU5 to generate the processed image data, and the SAO parameters are also transmitted with the encoded data to an external decoder.

In light of above, by directly using the filtered pixel values, partially filtered pixel values and reconstructed pixel values of CUT5 to generate SAO parameters corresponding to CTU5, the in-loop filter 160 operates quickly and efficiently without waiting for reconstructed pixel values of CTU6 and CTU8.

It is noted that the deblocking filter 162 further performs deblocking-filtering operation on the right vertical boundaries and right horizontal boundaries of the blocks B4, B8, B12 and B16 of CTU5 after receiving the reconstructed pixel values of CTU6, and performs deblocking-filtering operation on the lower horizontal boundaries of the blocks B13-B16 of CTU5 after receiving the reconstructed pixel values of CTU8. The processed image data stored in a memory or buffer 170 may be updated accordingly.

Figure 4A:
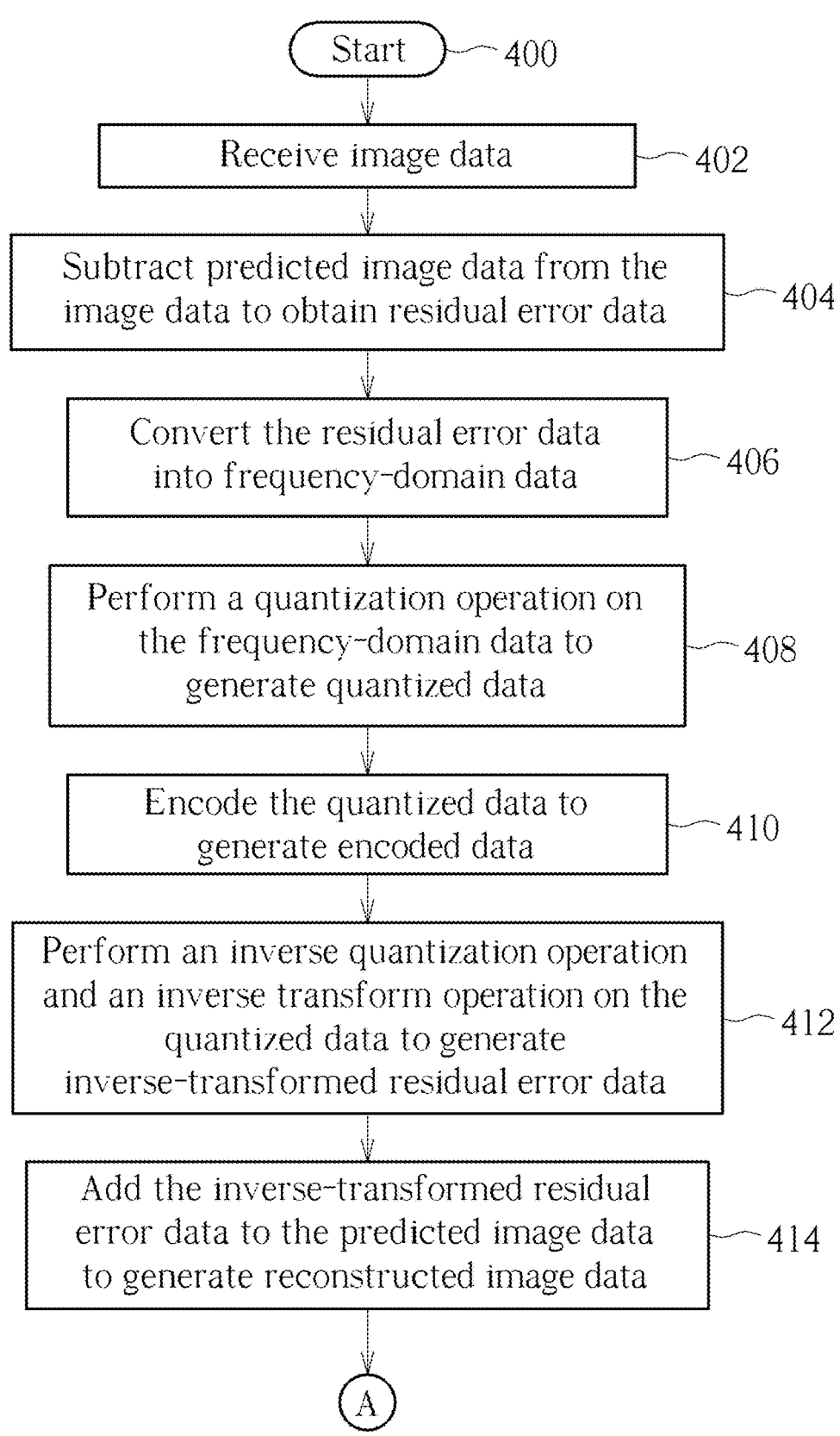
FIG. 4A and FIG. 4B show a flowchart of an encoding method according to one embodiment of the present invention.
Figure 4B:
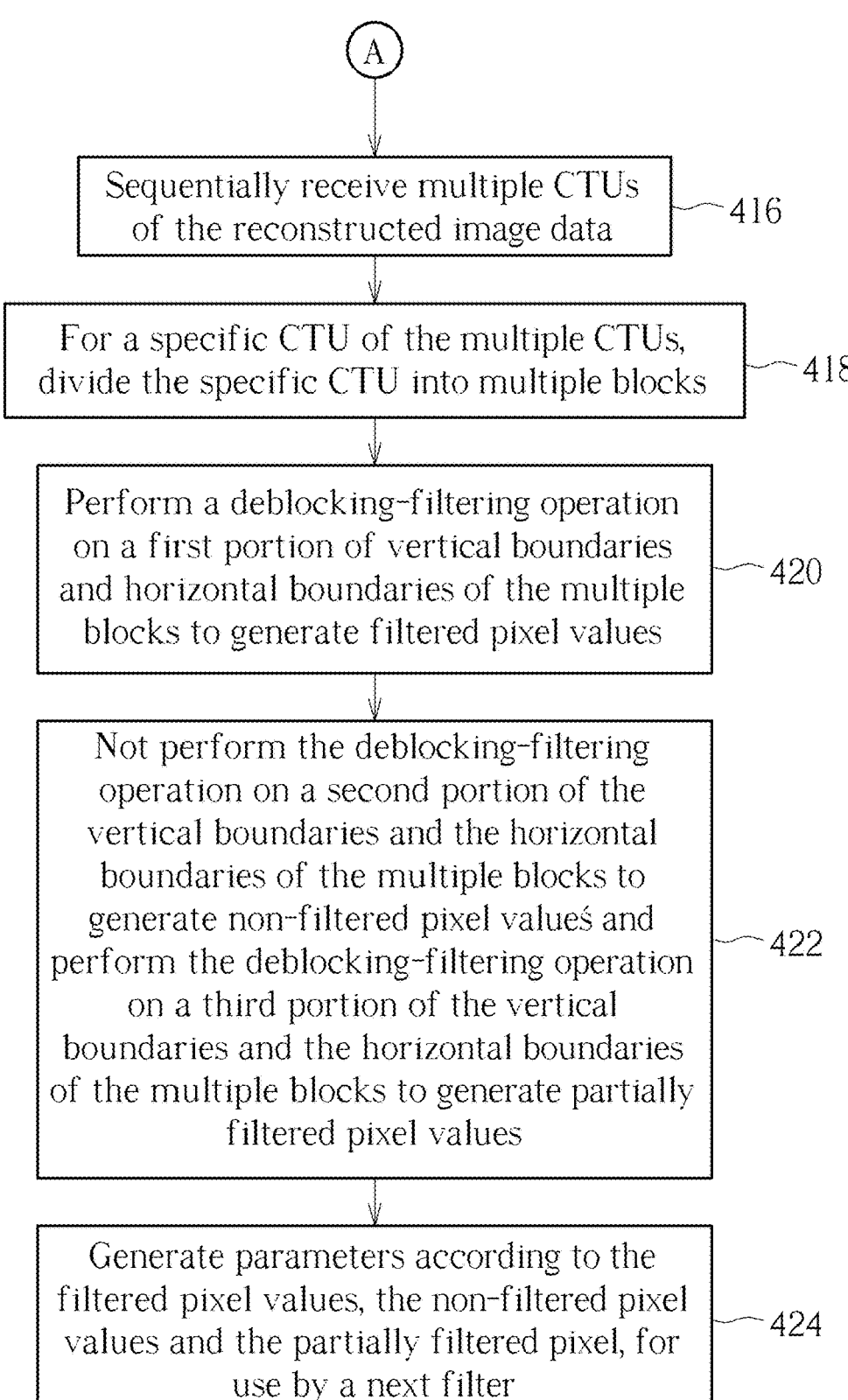

FIG. 4A and FIG. 4B show a flowchart of an encoding method according to one embodiment of the present invention. Referring to the above embodiments together, the flow of encoding method is described as follows.

Step 400: the flow starts.

Step 402: receive image data.

Step 404: subtract predicted image data from the image data to obtain residual error data.

Step 406: convert the residual error data into frequency-domain data.

Step 408: perform a quantization operation on the frequency-domain data to generate quantized data.

Step 410: encode the quantized data to generate encoded data.

Step 412: perform an inverse quantization operation and an inverse transform operation on the quantized data to generate inverse-transformed residual error data.

Step 414: add the inverse-transformed residual error data to the predicted image data to generate reconstructed image data.

Step 416: sequentially receive multiple CTUS of the reconstructed image data.

Step 418: for a specific CTU of the multiple CTUS, divide the specific CTU into multiple blocks.

Step 420: perform a deblocking-filtering operation on a first portion of vertical boundaries and horizontal boundaries of the multiple blocks to generate filtered pixel values.

Step 422: not perform the deblocking-filtering operation on a second portion of the vertical boundaries and the horizontal boundaries of the multiple blocks to generate non-filtered pixel values; and perform the deblocking-filtering operation on a third portion of the vertical boundaries and the horizontal boundaries of the multiple blocks to generate partially filtered pixel values.

Step 424: generate parameters according to the filtered pixel values, the non-filtered pixel values and the partially filtered pixel, for use by a next filter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an in-loop filter, comprising:
sequentially receiving multiple coding tree units (CTUs) of image data;
for a specific CTU of the multiple CTUs, dividing the specific CTU into multiple blocks;
performing a deblocking-filtering operation on a first portion of vertical boundaries and horizontal boundaries of the multiple blocks to generate filtered pixel values;
not performing the deblocking-filtering operation on a second portion of the vertical boundaries and the horizontal boundaries of the multiple blocks to generate non-filtered pixel values;
performing the deblocking-filtering operation on a third portion of the vertical boundaries and the horizontal boundaries of the multiple blocks to generate partially filtered pixel values; and
generating parameters according to the filtered pixel values, the non-filtered pixel values and the partially filtered pixel values, for use by a next filter.

2. The control method of claim 1, wherein the step of performing the deblocking-filtering operation on the third portion of the vertical boundaries and the horizontal boundaries of the multiple blocks to generate the partially filtered pixel values comprises:
performing the deblocking-filtering operation only on the vertical boundaries of a portion of the multiple blocks to generate the partially filtered pixel values.

3. The control method of claim 2, wherein the portion of the multiple blocks is in a bottom block row of the specific CTU.

4. The control method of claim 1, wherein the second portion of the vertical boundaries and the horizontal boundaries of the multiple blocks is in a rightmost block column of the specific CTU.

5. The control method of claim 1, wherein the next filter is a sample adaptive offset (SAO) filter, and the parameters are SAO parameters.

6. The control method of claim 1, wherein the in-loop filter is positioned in an encoder with High Efficiency Video Coding (HEVC) specification.

7. An encoder, comprising:
a first calculation circuit, configured to subtract predicted image data from image data to obtain residual error data;
a transform circuit, configured to convert the residual error data into frequency-domain data;
a quantization circuit, configured to perform a quantization operation on the frequency-domain data to generate quantized data;
an encoding circuit, configured to encode the quantized data to generate encoded data;
an inverse quantization circuit, configured to perform an inverse quantization operation on the quantized data;
an inverse transform circuit, configured to perform an inverse transform operation on an output of the inverse quantization circuit to generate inverse-transformed residual error data;

a second calculation circuit, configured to add the inverse-transformed residual error data to the predicted image data to generate reconstructed image data; and
an in-loop filter, configured to filter the reconstructed image data to generate processed image data;
wherein the in-loop filter performs steps of:
sequentially receiving multiple coding tree units (CTUs) of the reconstructed image data;
for a specific CTU of the multiple CTUs, dividing the specific CTU into multiple blocks;
performing a deblocking-filtering operation on a first portion of vertical boundaries and horizontal boundaries of the multiple blocks to generate filtered pixel values;
not performing the deblocking-filtering operation on a second portion of the vertical boundaries and the horizontal boundaries of the multiple blocks to generate non-filtered pixel values;
performing the deblocking-filtering operation on a third portion of the vertical boundaries and the horizontal boundaries of the multiple blocks to generate partially filtered pixel values; and
generating parameters according to the filtered pixel values, the non-filtered pixel values and the partially filtered pixel values, for use by a next filter.

8. The encoder of claim 7, wherein the step of performing the deblocking-filtering operation on the third portion of the vertical boundaries and the horizontal boundaries of the multiple blocks to generate the partially filtered pixel values comprises:
performing the deblocking-filtering operation only on the vertical boundaries of a portion of the multiple blocks to generate the partially filtered pixel values.

9. The encoder of claim 8, wherein the portion of the multiple blocks is in a bottom block row of the specific CTU.

10. The encoder of claim 7, wherein the second portion of the vertical boundaries and the horizontal boundaries of the multiple blocks is in a rightmost block column of the specific CTU.

11. The encoder of claim 7, wherein the next filter is a sample adaptive offset (SAO) filter, and the parameters are SAO parameters.

12. The encoder of claim 7, wherein the in-loop filter is positioned in an encoder with High Efficiency Video Coding (HEVC) specification.

13. An encoding method, comprising:
receiving image data;
subtracting predicted image data from the image data to obtain residual error data;
converting the residual error data into frequency-domain data;
performing a quantization operation on the frequency-domain data to generate quantized data;
encoding the quantized data to generate encoded data;
performing an inverse quantization operation and an inverse transform operation on the quantized data to generate inverse-transformed residual error data;
adding the inverse-transformed residual error data to the predicted image data to generate reconstructed image data;
sequentially receiving multiple coding tree units (CTUs) of the reconstructed image data;
for a specific CTU of the multiple CTUs, dividing the specific CTU into multiple blocks;

performing a deblocking-filtering operation on a first portion of vertical boundaries and horizontal boundaries of the multiple blocks to generate filtered pixel values;

not performing the deblocking-filtering operation on a second portion of the vertical boundaries and the horizontal boundaries of the multiple blocks to generate non-filtered pixel values;

performing the deblocking-filtering operation on a third portion of the vertical boundaries and the horizontal boundaries of the multiple blocks to generate partially filtered pixel values; and generating parameters according to the filtered pixel values, the non-filtered pixel values and the partially filtered pixel values, for use by a next filter.

\* \* \* \* \*